United States Patent [19]

Kikuchi

[11] Patent Number: 4,847,484

[45] Date of Patent: Jul. 11, 1989

[54] PORTABLE IMAGE SANNER HAVING MOVEMENT DETECTION MEANS AND A WINDOW FOR TRANSMITTING LIGHT TO THE VIEWER

[75] Inventor: Kazuo Kikuchi, Miyagi, Japan

[73] Assignee: Alps Electric Co., Ltd., Japan

[21] Appl. No.: 147,152

[22] Filed: Jan. 21, 1988

[30] Foreign Application Priority Data

Apr. 23, 1987 [JP] Japan .................................. 62-98556

[51] Int. Cl.4 .............................................. G09G 3/02
[52] U.S. Cl. ..................................... 250/221; 340/710
[58] Field of Search ................ 250/221, 239; 235/472; 340/710; 358/199, 285, 293, 295; 382/59

[56] References Cited

U.S. PATENT DOCUMENTS 3,541,248  11/1970  Young ................................ 250/221
4,251,798   2/1981  Swartz et al. ........................ 382/59
4,392,053   7/1983  Bockholt ............................ 235/472

Primary Examiner—David C. Nelms
Assistant Examiner—Stephone B. Allen
Attorney, Agent, or Firm—Guy W. Shoup; Paul J. Winters; Stephen L. Malaska

[57] ABSTRACT

An image scanner capable of precisely inputting information is disclosed. A light transmission path is formed through a wall portion of a scanner body to enable the operator to visually confirm a reading position on the document from the outside of the scanner body through an opening for reading the document. A read starting position on the document can be confirmed by turning on the light source only without inputting the information to a data processing means according to a signal from a scanner body moving amount detecting means.

4 Claims, 4 Drawing Sheets

PORTABLE IMAGE SANNER HAVING MOVEMENT DETECTION MEANS AND A WINDOW FOR TRANSMITTING LIGHT TO THE VIEWER

BACKGROUND OF THE INVENTION

The present invention relates to an image scanner, and more particularly to a handy-type image scanner capable of precisely inputting information.

In displaying information of an information source (document) containing information such as characters and graphic data, an image scanner is used as an information inputting source. The image scanner is generally classified into two types with respect to an operation method thereof. In one type, the document itself is moved to input the information, and in another type, the document is fixed, while the image scanner is moved to input the information.

In the type where the image scanner is moved to input the information, a conventional image scanner is constructed by integrally forming a scanner body with a data processing means for processing the information inputted from the scanner body. However, there has been recently proposed a handy-type image scanner including the scanner body separated from the data processing means, wherein an operator holds the scanner body with a hand to move same. It is considered that such a handy-type image scanner will be increasingly utilized widely since it is advantageously easy to handle and enables only a necessary part of the document to be inputted.

In inputting the information by the image scanner, it is necessary to confirm a position of the scanner body relative to the document so that an intended information area to be inputted is not departed from a readable area. Particularly, in the handy-type image scanner, the information to be inputted is often a part of the document. Moreover, as the document is manually scanned, a scanning direction tends to be unstable. Accordingly, the operator is required to excessively pay attention to the inputting of the information. Further, there is a possibility that an intended information is not properly inputted.

If it is confirmed at a real time and easily that the intended information in the document is present in the readable area by the scanner body, the operability and the reliability of the handy-type image scanner in particular will be widely improved.

In order to easily confirm the information reading position on the document as mentioned above, the applicant has proposed an image scanner utilizing a light source for irradiating light onto the document and guiding a part of a reflected light from the document to the outside through a light transmission path formed through a scanner body.

With this arrangement, the operator can visually confirm the information reading position on the document illuminated by the light source through the light transmission path, thereby remarkably improving the operability of the handy-type image scanner. However, there is yet present a problem. That is, the reading of information into the data processing means is effected by detecting the movement of the scanner body on the document. Accordingly, when the reading position on the document is confirmed as the scanner body is being moved, undue information is read by the data processing means during the movement of the scanner body. Such a problem should be further improved at present.

SUMMARY OF THE INVENTION

It is an object of the present invention to provide an image scanner which enables an operator to easily confirm a reading position on a document by utilizing a reflected light from the document irradiated from a light source, thereby greatly improving the operability and the reliability of the image scanner.

It is another object of the present invention to provide an image scanner which can reliably prevent that undue data is read while the operator confirms a read starting position according to a signal from a scanner body moving amount detecting means.

According to the present invention, a light transmission path is formed through a wall portion of a scanner body to enable the operator to visually confirm a reading position on the document from the outside of the scanner body through an opening for reading the document. A read starting position on the document can be confirmed by turning on the light source only without inputting the information to a data processing means according to a signal from a scanner body moving amount detecting means.

When the scanner body placed on the document is moved, a moving amount of the scanner body is detected by the scanner body moving amount detecting means. According to a detection signal from the detecting means, the light source is turned on, and a condition where no data is inputted to the data processing means is maintained. Thus, the document is illuminated by the light from the light source as the scanner body is being moved, thereby enabling the operator to confirm the read starting position on the document from the outside of the scanner body through the light transmission path. At this time, although the scanner body is moved, the data processing means does not read undue information.

When the operator visually confirms that the opening of the scanner body for reading the document has located at the reading position, the light source is turned on again, and simultaneously, a reading signal is inputted to the data processing means, thereby carrying out the reading of information of the document.

Other objects and features of the invention will be more fully understood from the following detailed description and appended claims when taken with the accompanying drawings.

DETAILED DESCRIPTION OF THE PREFERRED EMBODIMENTS

Figure 1:
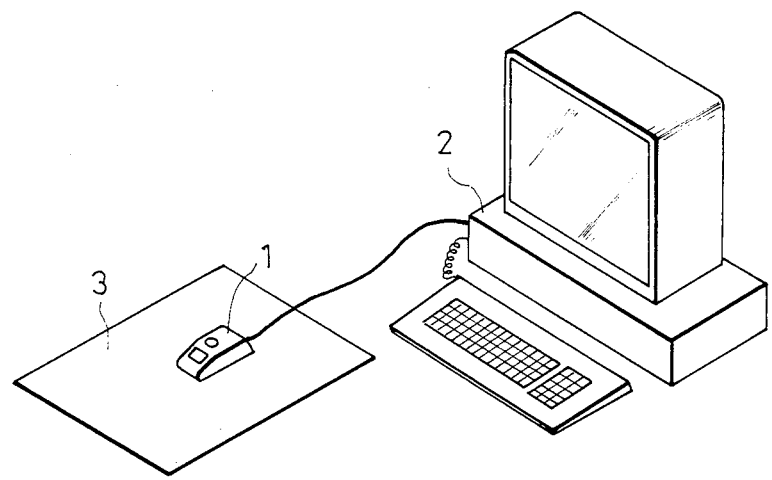
FIG. 1 is a schematic perspective view of the image scanner as a whole of a preferred embodiment according to the present invention.

Referring now to FIG. 1, a scanner body 1 is connected to a data processing means 2 such as a personal computer with CRT. The scanner body 1 is placed in contact with a document 3 at a desired position, and is scanned in a desired range of the document 3, thereby selectively reading information in a limited range of the document 3.

Figure 2:
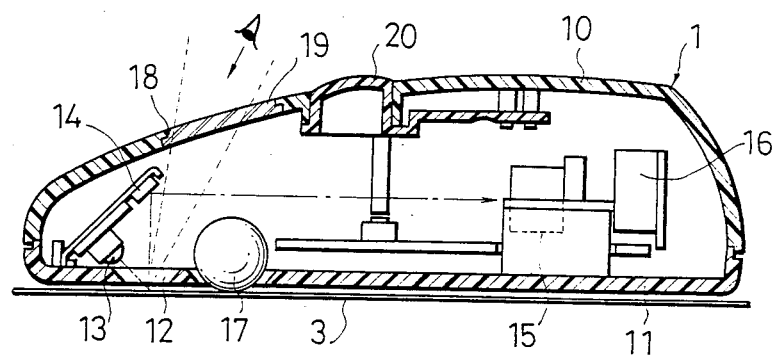
FIG. 2 is a vertical sectional view of the scanner body shown in FIG. 1.

Referring to FIG. 2, the scanner body 1 includes an upper case 10 and a lower case 11. The lower case 11 is formed with an opening 12 allowing an operator to read the information of the document 3. There is enclosed in the scanner body 1 a light source 13 such as a light emitting diode (LED) for irradiating light through the opening 12 onto the document 3. The light irradiated from the light source 13 onto the document 3 is reflected on the document 3, and the reflected light is changed in its light path into an axial direction of the scanner body 1 by a mirror 14. The light from the mirror 14 is collected through a lens 15 onto an image sensor 16 provided with a solid-state image pick-up device having a picture element in the form of a line.

The lower case 11 is provided with a roller 17 for detecting a moving distance of the scanner body 1. An encoder to be hereinafter described for enabling the detection of the moving distance is connected to the roller 17. That is, a rotative angle of the roller 17 is detected by the encoder to thereby detect the moving amount of the roller 17.

The upper case 10 is formed with a window 18 allowing the formation of light transmission path, so as to confirm a reading position of the document 3. A colored transparent plate 19 is fitted with the window 18, so as to reduce entry of external light through the window 18 into the scanner body 1 to a minimum and thereby prevent the reduction in SN ratio of the image sensor 16 due to such a disturbance light. The light source 13 is utilized by the operator to confirm the document 3 from the window 18 through the opening 12. When the light source 13 is turned on to irradiate light onto the document 3, the reflected light from the document 3 is partially leaked through the window 18 to the outside. With this arrangement, the operator can visually perceive a position where the opening 12 is opposed to the document 3, thereby confirming the reading position of the document 3.

Thus, the image scanner according to the present invention is designed to select a search mode where the light source 13 is turned on, but a read signal in the image sensor 16 is not inputted to the data processing means 2 and an operation mode where the light source 13 is turned on, and the read signal in the image sensor 16 is inputted to the data processing means 2.

Figure 3:
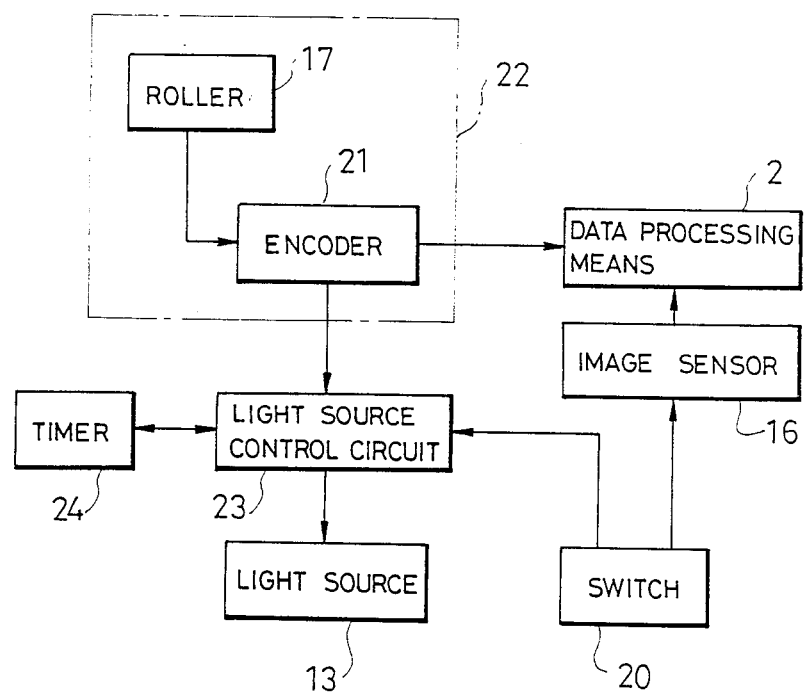
FIG. 3 is a block diagram of the image scanner.

To effect the selection of these modes, the roller 17 is connected to an encoder 21 for detecting the rotative angle of the roller 17 as shown in FIG. 3. The roller 17 and the encoder 21 constitute a scanner body moving amount detecting means 22 for detecting a moving amount of the scanner body 1 in a sub-scanning direction perpendicular to a main scanning line as the picture element line forming the image sensor 16 according to a signal from the encoder 21. A detection signal indicative of this movement in the sub-scanning direction is inputted as a sub-scanning signal to the data processing means 2. The detection signal is permitted to be also inputted to a light source control circuit 23 for controlling ON and OFF of the light source 13.

The scanner body 1 is provided with a switch 20 at a position where the switch 20 can be operated by hand holding the scanner body 1. The switch 20 serves to control the reading of the document 3. During the on-state of the switch 20, the output signal from the switch 20 is inputted to the light source control circuit 23 to maintain the light source 13 in an on-state. Simultaneously, the image sensor 16 is driven by the output signal from the switch 20, and the detection signals from the image sensor 16 is sequentially read to be inputted to the data processing means 2, which also receives the sub-scanning signal from the scanner body moving amount detecting means 22 as mentioned above. Accordingly, while the switch 20 is maintained in the on-state, the operation mode is effected.

On the other hand, when the switch 20 is turned off, and the roller 17 in the scanner body 1 is rolled on the document 3, a signal from the encoder 21 in the scanner body moving amount detecting means 22 is inputted as a search start signal to the light source control circuit 23 to turn on the light source 13 under the condition where the reading of data from the image sensor 16 is inhibited. That is, the search mode is effected. In this mode, a read start position on the document 3 can be confirmed. Further, a timer 24 is attached to the light source control circuit 23. The timer 24 serves to continue the on-state of the light source 13 during a period of time set by the timer 24 after the input of the moving signal of the scanner body 1 from the encoder 21 to the light source control circuit 23 is stopped.

In reading the information from the document 3 by using the image scanner as mentioned above, the switch 20 of the scanner body 1 is first turned off, and the scanner body 1 is placed on a position where the information of the document 3 is intended to be read. For precise reading of the document, the opening 12 of the scanner body 1 must be precisely located at the reading position.

To confirm whether or not the opening 12 is located at the reading position of the document 3, the roller 17 of the scanner body 1 is rolled on the document 3. The rolling motion of the roller 17 is detected by the encoder 21. The detection signal from the encoder 21 is inputted to the light source control circuit 23 to turn on the light source 13. However, as the switch 20 remains off, any data is not inputted to the data processing means 2. Thus, the search mode is effected to irradiate light from the light source 13 onto the document. As a result, the reflected light from the document 3 is made incident upon the image sensor 16 through the mirror 14 and the lens 15. Simultaneously, the reflected light is partially leaked as an illuminating light for the document through the colored transparent plate 19 fitted with the window 18 to the outside of the scanner body 1. Such a leaked light is visually perceived by the operator to enable the operator to precisely confirm the reading position of the document 3. In this search mode, as the switch 20 for operating the image sensor 16 in the scanner body 1 remains off, no data is read by the data processing means 2.

In operating the image scanner, the roller 17 is sometimes slightly rolled when the scanner body 1 is held by a hand. However, as the reading position is intended not to be searched in this case, the light source 13 is not required to be turned on. Therefore, in the case where the moving amount of the roller 17 is not greater than a width of the main scanning line, for example, the light source 13 is maintained in the off-state to prevent the malfunction of the light source 13.

After confirming the reading position of the document 3, the scanner body 1 is maintained at rest in this position. At this time, the timer 24 is operated, and after the time set by the timer 24 (four seconds, for example) is elapsed, the light source 13 is turned off to restore an initial condition. In this case, when the above operation is stopped for any reason during the confirmation of the reading position, the scanner body 1 is made at rest in the same manner as the above. As a result, the light source 13 continues to be lighted for the period of time set by the timer 24, and thereafter the timer 24 is turned off to restore the initial condition.

When the reading position of the document 3 is confirmed as mentioned above, the switch 20 of the scanner body 1 is turned on to effect the operation mode. Then, the light source control circuit 23 is operated according to a signal from the switch 20 to thereby turn on the light source 13 and also drive the image sensor 16. As a result, a document reading signal from the image sensor 16 is inputted to the data processing means 2. Simultaneously, a sub-scanning signal from the encoder 21 is also inputted to the data processing means 2. Thus, the reading of information of the document 3 is carried out by the data processing means 2. In this manner, while the scanner body 1 is precisely directed to the information reading position on the document 3 under the on-condition of the light source 13, the reading of the document by the data processing means 2 is not carried out. Accordingly, it is possible to reliably prevent that undue data is read by the data processing means 2. Further, as the selection of the modes as mentioned above can be carried out by moving the scanner body 1 under the condition where the switch 20 remains ON or OFF, the operability is greatly improved.

Especially, in the case where a plurality of portions of the same document are read, a first reading position is confirmed in the search mode as the scanner body 1 is being moved. Then, the switch 20 is turned on to effect the operation mode and read the data. Then, the search mode is selected again, and the scanner body 1 is moved to the next reading position to confirm the reading position, then reading the data. In this manner, the same operation is sequentially conducted. As the above operation is carried out with a single hand holding the scanner body 1, the data at each reading position of the document 3 can be inputted greatly easily and smoothly, the operability of the image scanner is remarkably improved.

Figure 4:
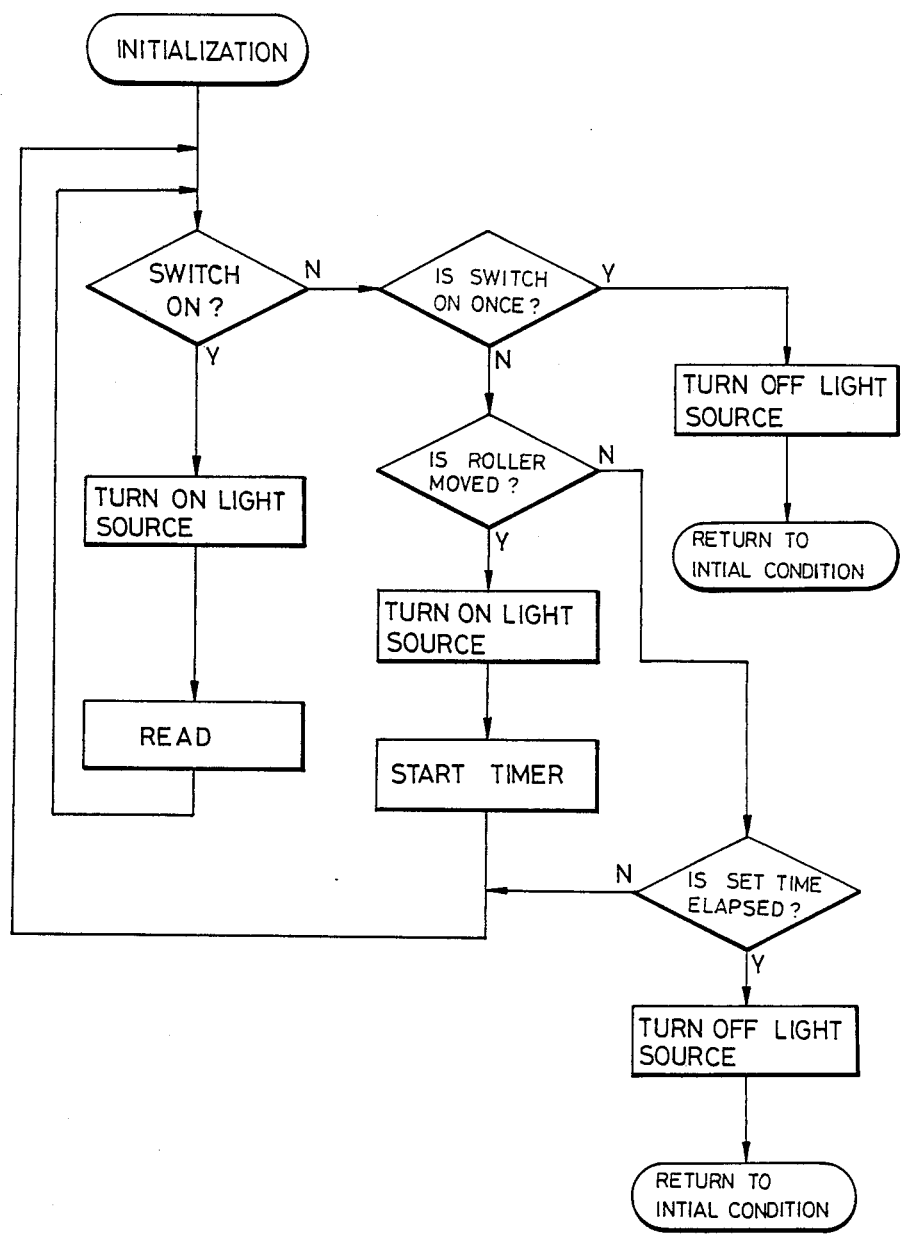
FIG. 4 is a flow chart showing the operation of the image scanner.
Figure 5:
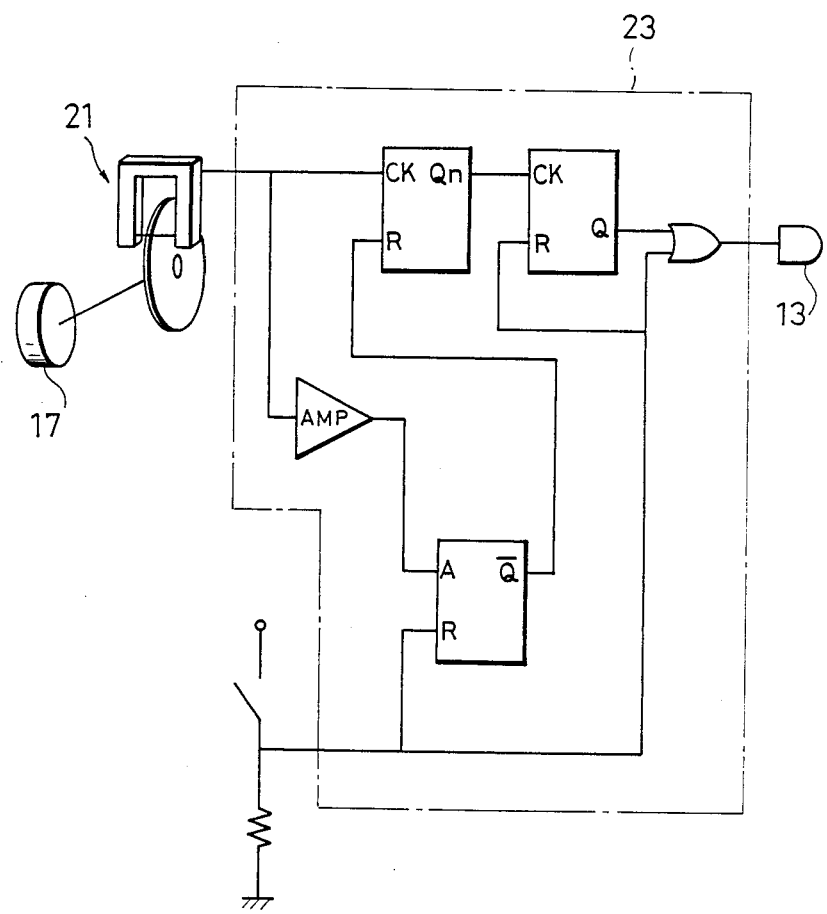
FIG. 5 is a circuit diagram showing the search mode.

The above-mentioned operation may be carried out in accordance with the algorithm as shown in FIG. 4. Further, the operation may be carried out in accordance with the circuitry as shown in FIG. 5.

Although the operation mode is effected only during the on-state of the switch 20 in the previous embodiment, the operation mode may be effected once the switch 20 is depressed, and the initial condition may be restored when the switch 20 is secondly depressed. Further, when the roller 17 in the scanner body 1 is once rolled, the search mode may be effected to enable the operator to confirm the reading position under the on-condition of the light source. After a predetermined time set by a timer is elapsed, the operation mode may be selected. Alternatively, after the search mode is effected by once rolling the roller, the reading position may be confirmed under a non-contact condition of the roller with respect to the document. When the roller is started again to be rolled on the document, the operation mode may be effected.

While the invention has been described with reference to specific embodiments, the description is illustrative and is not to be construed as limiting the scope of the invention. Various modification and changes may occur to those skilled in the art without departing from the spirit and scope of the invention as defined by the appended claims.

What is claimed is:

1. In an image scanner comprising a scanner body enclosing a light source for irradiating light onto a document and an image sensor for receiving a reflected light from said document and inputting information to a data processing means, scanner body moving amount detecting means for detecting a moving amount of said scanner body relative to said document fixed, a manual switch for switching between an operation mode and a search mode, and a light source controlling circuit for controlling a turned-on state of said light source in response to a signal from said manual switch and a signal from said moving amount detecting means, whereby the information within a desired width of said document can be read; the improvement comprising an opening for reading said document when said light source is turned on, and a light transmission path formed through a wall portion of said scanner body for enabling an operator to visually confirm a reading position on said document from the outside of said scanner body through said opening, said light source is turned on under the search mode when said scanner body is moved more than a predetermined amount, whereby said data processing means is not utilized, enabling an original reading start position to be confirmed.

2. The image scanner as defined in claim 1, wherein said manual switch is located at a holding position of said scanner body for controlling the reading of said document.

3. The image scanner as defined in claim 1, wherein said scanner body is formed by an upper case and a lower case, and said upper case is provided with a window above said opening, said window forming said light transmission path and being fitted with a colored transparent plate.

4. The image scanner as defined in Claim 1, wherein said light source control circuit includes a timer for turning off said light source while under the search mode when said scanner body has not been moved for a specified period of time.

* * * * *

UNITED STATES PATENT AND TRADEMARK OFFICE
CERTIFICATE OF CORRECTION

PATENT NO. : 4,847,484

DATED : July 11, 1989

INVENTOR(S) : Kazuo Kikuchi

It is certified that error appears in the above-identified patent and that said Letters Patent is hereby corrected as shown below:

<u>Title</u>

Line 1, "SANNER" should read --SCANNER--.

Signed and Sealed this

Eighth Day of May, 1990

*Attest:*

*Attesting Officer*

HARRY F. MANBECK, JR.

*Commissioner of Patents and Trademarks*